United States Patent
Whinnett et al.

(10) Patent No.: US 8,948,116 B2
(45) Date of Patent: *Feb. 3, 2015

(54) USE OF THE PHYSICAL UPLINK CONTROL CHANNEL IN A 3$^{rd}$ GENERATION PARTNERSHIP PROJECT COMMUNICATION SYSTEM

(71) Applicant: Motorola Mobility LLC, Libertyville, IL (US)

(72) Inventors: Nick W. Whinnett, Marlborough (GB); Fei Tong, Swindon (GB); Weimin Xiao, Barrington, IL (US); Robert T. Love, Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 13/727,637

(22) Filed: Dec. 27, 2012

(65) Prior Publication Data

US 2013/0114543 A1 May 9, 2013

Related U.S. Application Data

(63) Continuation of application No. 11/764,236, filed on Jun. 18, 2007, now Pat. No. 8,412,209.

(51) Int. Cl.
*H04W 4/00* (2009.01)
*H04W 72/04* (2009.01)
(Continued)

(52) U.S. Cl.
CPC ............. *H04W 72/04* (2013.01); *H04L 1/0027* (2013.01); *H04W 72/1257* (2013.01); *H04W 72/1268* (2013.01)
USPC ............................ 370/329; 370/330; 455/450

(58) Field of Classification Search
CPC ...... H04W 80/04; H04W 84/12; H04W 88/06; H04W 88/08; H04W 84/18; H04W 72/04; H04W 76/00; H04W 56/00; H04W 56/0045; H04B 7/2662; H04J 2011/0096
USPC ......... 370/328, 252, 336, 350, 344, 330, 329; 455/67, 550, 513, 522, 450; 375/267
See application file for complete search history.

(56) References Cited

U.S. PATENT DOCUMENTS

| | | |
|---|---|---|
| 5,960,389 A | 9/1999 | Jarvinen et al. |
| 2004/0064467 A1 | 4/2004 | Kola et al. |

(Continued)

OTHER PUBLICATIONS

Qualcomm Europe: "Scheduling requests using CQI", 3GPP TSQ-RAN WG1 #49, R1-072013, May 7, 2007, Kobe, Japan, URL: www.3gpp.org, pp. 1-3.

(Continued)

*Primary Examiner* — Dady Chery
(74) *Attorney, Agent, or Firm* — Faegre Baker Daniels LLP

(57) ABSTRACT

In a 3$^{rd}$ Generation Partnership Project, 3GPP, communication system a base station comprises a scheduler allocating communication resource of at least one of a Physical Uplink Shared CHannel, PUSCH, and a Physical Downlink Shared CHannel, PDSCH to a User Equipment (UE). The scheduling may either be a dynamic scheduling wherein a resource allocation for a single frame is provided to the UE or a persistent scheduling wherein a resource allocation for a plurality of frames is provided to the UE. A resource allocator assigns resource of a Physical Uplink Control CHannel, PUCCH, to the UE dependent on whether dynamic scheduling or persistent scheduling is performed by the scheduler for the UE. The UE transmits uplink control data on a physical uplink channel which is selected as the PUCCH or the PUSCH in response to whether persistent scheduling is used for the UE. The invention allows e.g. reduced PUCCH loading.

20 Claims, 4 Drawing Sheets

(51) Int. Cl.
*H04L 1/00* (2006.01)
*H04W 72/12* (2009.01)

(56) References Cited

U.S. PATENT DOCUMENTS

| | | |
|---|---|---|
| 2005/0250511 A1 | 11/2005 | Xiao et al. |
| 2006/0251031 A1 | 11/2006 | Anderson et al. |
| 2007/0133458 A1 | 6/2007 | Chandra et al. |
| 2007/0171849 A1 | 7/2007 | Zhang et al. |
| 2007/0177569 A1 | 8/2007 | Lundby |
| 2007/0245201 A1 | 10/2007 | Sammour et al. |
| 2007/0245273 A1 | 10/2007 | Catthoor et al. |
| 2008/0008112 A1 | 1/2008 | Lee |
| 2008/0049795 A1 | 2/2008 | Lakaniemi |
| 2008/0159323 A1 | 7/2008 | Rinne et al. |
| 2008/0233964 A1 | 9/2008 | McCoy et al. |
| 2009/0185638 A1 | 7/2009 | Imamura et al. |
| 2009/0262699 A1 | 10/2009 | Wengerter et al. |
| 2010/0238870 A1 | 9/2010 | Mitra et al. |

OTHER PUBLICATIONS

Philips: "Draft reply to LS on CQI feedback", 3GPP TSG-RAN1 Meeting #49, R1-072548, May 11, 2007, Kobe, Japan, URL: www.3gpp.org, pp. 1-3.

Texas Instruments: "Preamble-Based Scheduling Request: Comparison with Other Solutions", 3GPP TSG RAN WG1 #48, R1-070718, Feb. 12, 2007, St. Louis, USA, URL: www.3gpp.org, pp. 1-8.

USE OF THE PHYSICAL UPLINK CONTROL CHANNEL IN A 3$^{rd}$ GENERATION PARTNERSHIP PROJECT COMMUNICATION SYSTEM

FIELD OF THE INVENTION

The invention relates to the Physical Uplink Control CHannel (PUCCH) of a 3rd Generation Partnership Project communication system and in particular, but not exclusively, to a Long Term Evolution communication system.

BACKGROUND OF THE INVENTION

In order to provide improved communication services and increased efficiency, cellular communication systems are continuously developed and enhanced. Currently, the 3$^{rd}$ Generation Partnership Project (3GPP) standards body is in the process of standardising improvements to the Universal Mobile Telecommunication System (UMTS) known as Long Term Evolution (LTE).

Similarly, to advanced communication services, such as High Speed Downlink Packet Access (HSDPA) and High Speed Uplink Packet Access (HSUPA), LTE uses very fast scheduling of communication resources allocated to user traffic and control data over the air interface. Specifically, scheduling for user traffic may be performed in the individual serving base station (node B) thereby allowing scheduling to be so fast that it can follow changes in the characteristics of the propagation channels to the individual User Equipments (UEs). This is used to schedule data for UEs such that data is predominantly scheduled for UEs which currently experience advantageous propagation conditions. The fast scheduling may be performed both for uplink user data traffic transmitted on a physical channel known as the Physical Uplink Shared CHannel (PUSCH) and for downlink user data traffic transmitted on a physical channel known as the Physical Downlink Shared CHannel (PDSCH).

In LTE, the resource allocation can be changed in subframes having a duration of only 1 msec with a typical scheduling interval (i.e. how often the scheduling algorithm runs) of between 1 and 10 sub-frames. One frame consists of 10 such consecutive subframes. The PUSCH and PDSCH are shared channels wherein the scheduling is not only dependent on the current propagation conditions but also on the resource requirement of the UEs. In order to simplify the scheduling and to reduce the signalling overhead, LTE allows for persistent scheduling wherein a resource allocation for the PUSCH or PDSCH may be made for a plurality of frames.

In order to provide efficient fast scheduling in the base station, the UE must transmit uplink control information to the scheduling base station. Specifically, the UE transmits Channel Quality Indicator (CQI) data which is indicative of the current propagation conditions for the UE. Based on measurements of the received signal the UE generates a CQI which may indicate a modulation scheme and data rate that is considered to be supportable by the air interface communication channel from the base station to the UE, or which may be a measure of the Signal to Noise plus Interference Ratio. As another example, LTE uses a retransmission scheme (referred to as ARQ or Hybrid ARQ (HARQ)) and the UE transmits ARQ data in the form of uplink acknowledge (ACK) or non-acknowledge (NACK) messages which are used to determine whether individual data packets need to be retransmitted. As yet another example, LTE allows the base station to utilise adaptive antenna technology and the UE may report Precoding Matrix Index (PMI) which is used to signal the antenna weights recommended by the UE for the individual antenna elements.

The uplink control information is transmitted using physical uplink channels. Specifically, in subframes wherein the UE transmits uplink user data traffic on the PUSCH, the control data is embedded within the transmission such that the control information is transmitted to the base station using the PUSCH. However, for subframes wherein no uplink user data traffic is transmitted on the PUSCH, the UE uses a physical uplink channel known as the Physical Uplink Control CHannel (PUCCH) to transmit the control information. Thus, the physical air interface channel used for the transmission of the control information may change for different subframes.

Although this approach has some advantages it tends to also have some disadvantages and tends to be inefficient. For example, the resource of the PUCCH tends to be limited and may in some cases limit the capacity of the system as a whole. Also, as the control information may be transmitted on different physical uplink air interface channels, the base station typically needs to decode both of these channels in order to determine on which channel the data was transmitted.

Hence, an improved 3GPP system would be advantageous and in particular a system allowing increased flexibility, improved resource utilisation, facilitated operation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a 3$^{rd}$ Generation Partnership Project, 3GPP, communication system in accordance with claim 1.

The invention may provide an improved 3GPP communication system. In particular, a more efficient resource usage may be achieved for uplink control data which specifically may be layer 1 (physical layer) signalling data such as CQI, PMI and/or layer 2 HARQ data.

The inventors of the current invention have realised that improved performance can be achieved by making assignment of PUCCH resource dependent on the type of scheduling currently being used for the specific UE. The invention may in many scenarios achieve reduced PUCCH resource usage and may e.g. allow otherwise unused PUSCH resource to be used for transmission of uplink control information.

According to another aspect of the invention there is provided a base station in accordance with claim 18.

According to another aspect of the invention there is provided a User Equipment in accordance with claim 19.

According to another aspect of the invention there is provided a method of operation for a 3$^{rd}$ Generation Partnership Project, 3GPP, communication system in accordance with claim 20.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
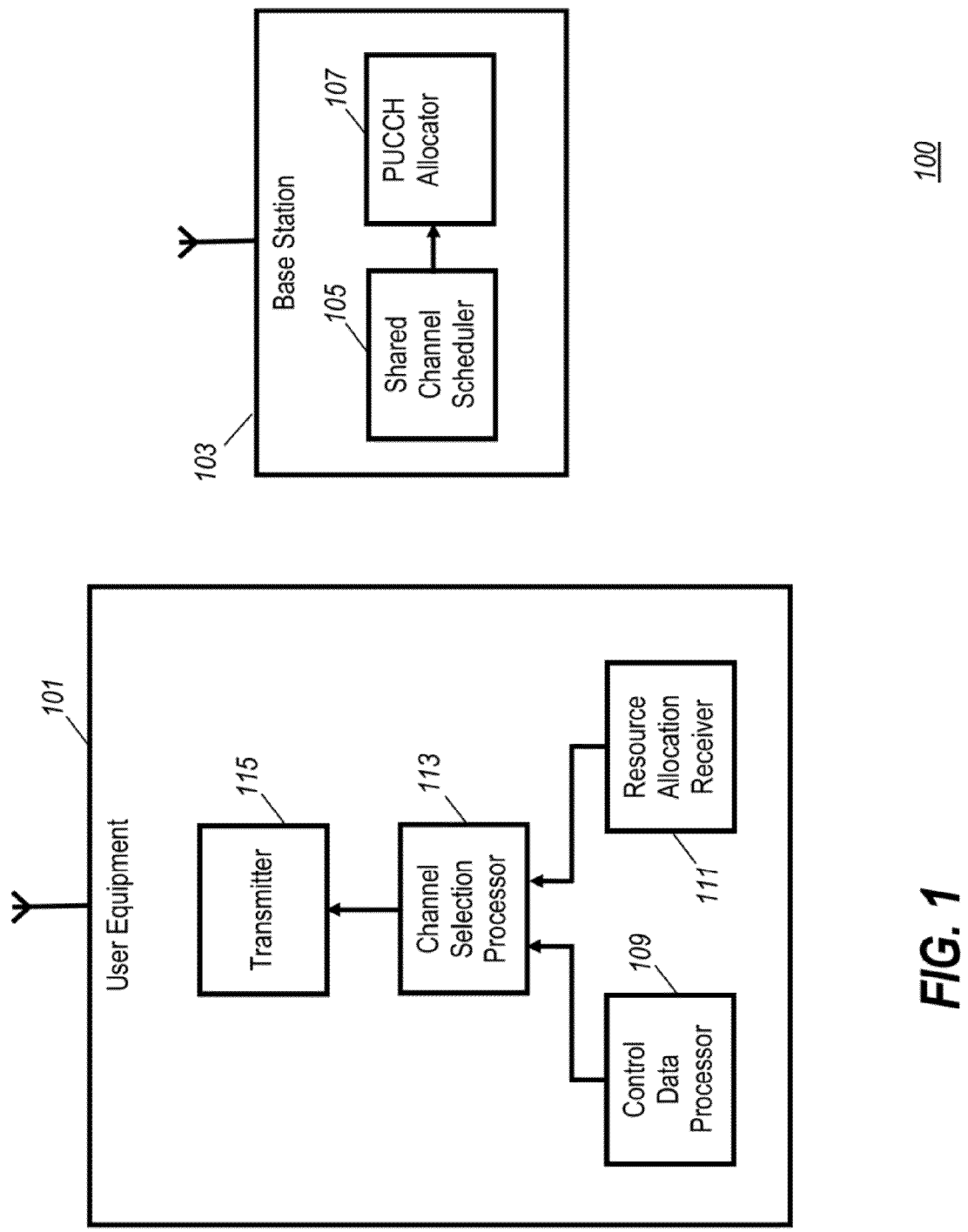
FIG. 1 illustrates an example of a UE and a base station in accordance with some embodiments of the invention.

FIG. 1 illustrates an example of a User Equipment (UE) 101 and a base station 103 in accordance with some embodiments of the invention. The UE 101 and the base station 103 are arranged to communicate with each other using LTE compatible air interface communications as will be described in the following. It will be appreciated that the UE 101 and/or the base station 103 may also comprise functionality for communication over the air interface in accordance with standard UMTS requirements.

The base station 103 comprises a shared channel scheduler 105 which is operable to allocate communication resource of shared uplink and/or downlink physical air interface channels. In the example, the shared channel scheduler 105 is responsible for allocating communication resource of a PUSCH and a PDSCH channel supported by the base station base station 103. It will be appreciated that in some embodiments, the shared channel scheduler 105 may only be arranged to allocate resource for either one of the PUSCH and the PDSCH.

The shared channel scheduler 105 is arranged to perform fast scheduling such that the resource allocation reflects the instantaneous propagation conditions for the UEs to be scheduled. In order to do so, the shared channel scheduler 105 can schedule resource within very short time intervals.

Specifically, PUSCH and PDSCH uses a frame structure wherein each frame has a duration of 10 msecs. The frame is divided into 20 slots of 0.5 msec and two slots form a subframe with a duration of 1 msec. In the system, the resource allocation of the PUSCH and PDSCH can be changed in each subframe. Thus, in the system, the resource allocation for the UE 101 may be changed at 1 msec intervals.

Although such fast scheduling allows effective use of the air interface resource it also has some disadvantages. In particular, it requires that scheduling data is frequently transmitted to the UEs which can result in increased overhead. In order to facilitate scheduling and reduce the air interface signalling overhead, LTE allows that persistent scheduling may be performed where a PDSCH or PUSCH resource allocation is provided for a plurality of frames.

For example, if the UE 101 is currently supporting a Voice over Internet Protocol (VoIP) voice communication service, data of a speech burst may currently be transmitted from the UE 101 to the base station 103. As a speech burst is much longer than the frame duration, the UE 101 will require the same PUSCH resource allocation for a plurality of consecutive frames. Accordingly, the shared channel scheduler 105 may perform a persistent scheduling wherein a fixed resource allocation is assigned to the UE 101 for a plurality of frames (e.g. for 10 frames). During this persistent scheduling interval, the UE 101 can thus freely use the allocated resource block(s) in each frame and typically for a VoIP communication the vast majority (but typically not all) of the allocated subframes will be used to transmit voice data during a speech burst. Alternatively the duration may be unlimited such that the UE may use the assigned resource until further notice. A persistent allocation may also be made in non-contiguous frames e.g. resource may be assigned to a UE every 20 ms.

Thus, in the example, the shared channel scheduler 105 may perform either dynamic or persistent scheduling for the UE 101. For a dynamic scheduling, each resource allocation is limited to be within a single frame (and may specifically be an allocation of a resource block in a single subframe) whereas for a persistent scheduling each resource allocation relates to a plurality of frames (which may be consecutive). For example, a dynamic resource scheduling may allocate a resource block within a specific subframe of a specific frame to the UE 101 whereas a persistent scheduling may allocate a specific resource block within a specific subframe of a plurality of frames to the UE 101.

The base station 103 receives a range of uplink control data from the supported UEs. Such uplink control data includes Channel Quality Indicator (CQI) data which is used by the shared channel scheduler 105 to perform the fast resource scheduling. Specifically, the UE 101 measures the received signal to determine a received signal level/ quality and in response it generates CQI data which is transmitted to the base station. The CQI data indicates the current quality of the propagation channel to the UE 101 and the shared channel scheduler 105 takes this into account when scheduling resource for the different UEs. Specifically, the CQI may indicate the measured signal level/ quality directly for example it may be a measure of the signal to noise plus interference ratio.

As another example, the UEs can transmit Precoding Matrix Index (PMI) data to the base stations. In the example, the shared channel scheduler 105 comprises an adaptive antenna array which allows beamsteering by setting of weights for the individual antenna elements of the array (this weighting is known as precoding). The determination and setting of the weights are in the example based on a feedback loop where the UE 101 transmits PMI data, which is a recommendation of the precoding weights that the shared channel scheduler 105 uses to determine and set the weights. Note that in alternative embodiments the antenna beamsteering function may be implemented outside the shared channel scheduler 105.

As another example, LTE provides for the use of a retransmission scheme for communications over the air interface. Thus, the UE 101 transmits acknowledge/non-acknowledge data (Hybrid ARQ data) back to the shared channel scheduler 105 to indicate whether it is necessary to retransmit any specific data packets. Such retransmission acknowledgement data may relate to an initial transmission of a data packet or to further retransmissions of the data packet (including retransmissions comprising different elements of the encoded data in accordance with a Hybrid-ARQ scheme).

LTE provides a physical air interface channel known as the Physical Uplink Control CHannel, PUCCH, on which the uplink control data can be transmitted from the UE 101 to the base station 103.

Figure 2:
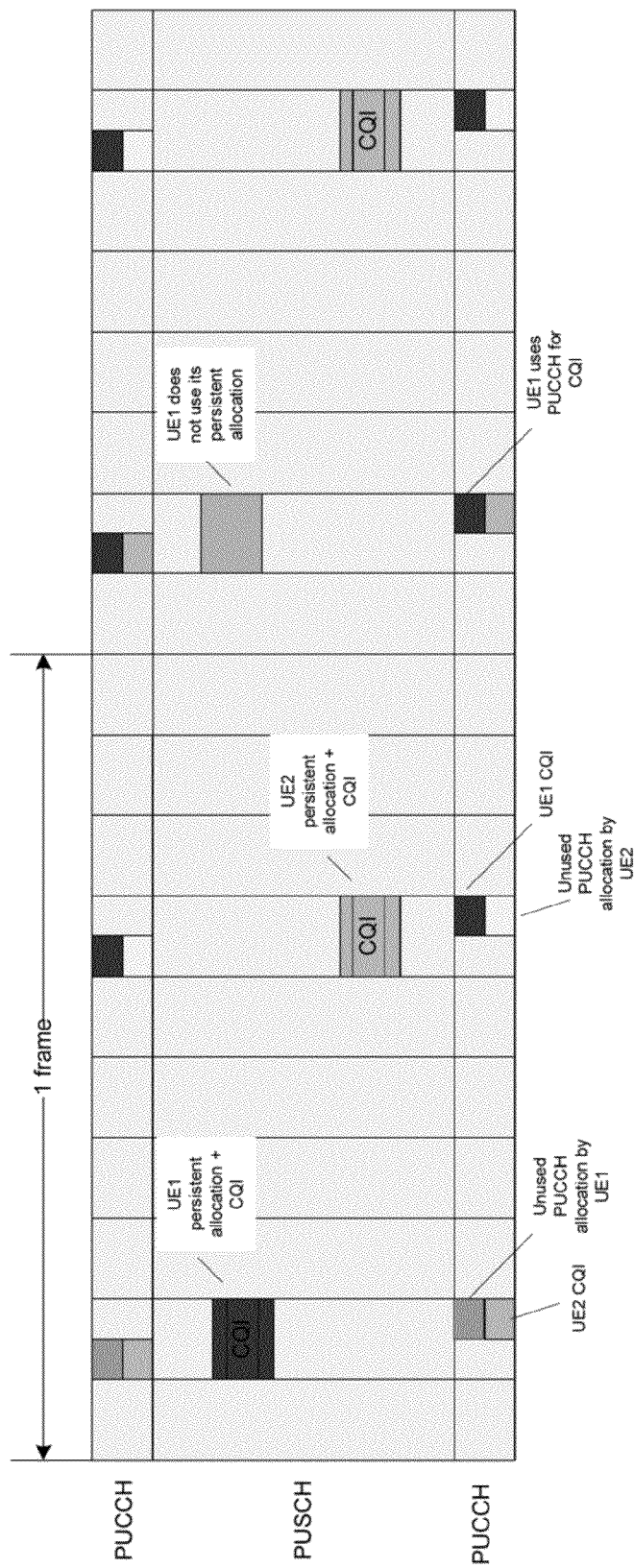
FIG. 2 illustrates an example of uplink user transmissions in a 3GPP communication system according to prior art.

The 3GPP standards community is currently standardising details of the PUCCH and various proposals have been put forward. One approach would be that PUCCH resource is allocated to all UEs requesting resource of the PUSCH such that a physical channel is available for transmission of CQI data even if no user data is transmitted on the PUSCH. However, LTE uses a Single Carrier Frequency Division Multiple Access (SC-FDMA) modulation scheme which requires all uplink transmissions to use a contiguous set of subcarriers. As the PUCCH is assigned to subcarriers towards the upper and lower end of the available subcarriers and the PUSCH may be allocated to subcarriers which are not adjacent to the PUCCH subcarriers, it is typically not possible to have simultaneous PUCCH and PUSCH transmissions. Accordingly, it has been proposed that uplink control data is transmitted together with user data on the PUSCH if there is such a transmission in the subframe and is transmitted on the PUCCH otherwise. An example of such an approach is shown in FIG. 2 wherein two UEs (UE1 and UE2) are persistently scheduled over (at least) two frames. As illustrated in FIG. 2, the PUCCH is transmitted on one set of subcarriers during the first half of a subframe and on another set of subcarriers during a second half of the subframe in order to provide frequency transmit diversity.

However, such an approach tends to have a number of disadvantages. For example, the PUCCH resource tends to be limited but is reserved even in situations where it is not actively used. Also, as the uplink data may be transmitted on two different physical channels, the base station must always decode both channels. This results in increased latency of the decoding of the uplink control data and increases the complexity and computational demand of the base station.

In the system of FIG. 1, a different approach is used where the physical channel used for the transmission of the uplink control data depends on whether dynamic or persistent scheduling has been performed for the UE 101. Specifically, if a dynamic resource allocation of PUSCH resource within a single frame has been provided to the UE 101, the UE 101 transmits the uplink control data on the PUSCH if other data is transmitted thereon and on the PUCCH if no other data is transmitted on the PUSCH. However, if persistent scheduling is performed, such that the UE 101 has been provided with a resource allocation for several frames, the CQI is always transmitted on the PUSCH for subframes in which the persistent scheduling has allocated PUSCH resource.

Thus, in the system of FIG. 1, the uplink control data, and specifically Layer 1 and layer 2 control signaling (CQI/PMI/ACK data) is always transmitted using the PUSCH persistent allocation even if the UE sends no other data on that persistent allocation.

The base station 103 comprises a PUCCH allocator 107 which is coupled to the shared channel scheduler 105. The PUCCH allocator 107 is responsible for assigning resources of the PUCCH to the individual UEs (and specifically to the UE 101). However, in contrast to previous approaches, this assignment is in the system of FIG. 1 made in response to the type of scheduling which is currently performed for the UE. When assigning PUCCH resource to the UE 101, the PUCCH allocator 107 determines whether dynamic or persistent scheduling is performed for the UE 101. If dynamic scheduling is performed, the PUCCH allocator 107 allocates PUCCH resource to the UE 101 which it can use for the uplink control data uplink transmission. However, if persistent scheduling is used for the UE 101, the PUCCH allocator 107 may not allocate any PUCCH resource whatsoever to the UE 101 as all uplink control data transmissions may be performed within the PUSCH allocations of the persistent scheduling.

It will be appreciated that in some embodiments, the PUCCH allocator 107 will simply select not to allocate any PUCCH resource whenever persistent scheduling is used whereas in other embodiments the PUCCH allocator 107 may further include other considerations, such as e.g. a reporting interval or delay for the uplink control data. For example this may result in a reduced PUCCH allocation being made compared to the dynamic scheduling case.

The UE 101 comprises a control data processor 109 which generates the uplink control data. In the specific example, the control data processor 109 generates CQI, PMI and HARQ data in accordance with the UMTS (LTE) specifications. It will be appreciated that any suitable algorithm or approach for generating the uplink control data may be used.

The UE 101 furthermore comprises a resource allocation receiver 111 which receives the PUSCH and PDSCH resource allocations from the base station 103. Specifically, the resource allocation receiver 111 receives resource allocation data which provides a resource allocation within one frame (a dynamic scheduling resource allocation) or a resource allocation within a plurality of frames (a persistent scheduling resource allocation).

The control data processor 109 and resource allocation receiver 111 are coupled to a channel selection processor 113 which selects whether to use the PUSCH or the PUCCH for uplink transmissions of uplink control data. The channel selection processor 113 is coupled to a transmitter 115 which is operable to make the uplink air interface transmissions of the uplink control data using the selected physical channel.

The channel selection processor 113 selects which physical channel to use in response to whether persistent scheduling is used for the UE 101. Specifically, whenever the resource allocation receiver 111 indicates that persistent scheduling is used for the UE 101, the channel selection processor 113 selects to transmit the uplink control data using the PUSCH if a PUSCH allocation is provided for the subframe. The use of the PUSCH in such a subframe is independent of whether any other data is transmitted by the UE 101 on the PUSCH during the subframe. Thus, when persistent scheduling is used for the UE 101, the CQI, PMI and/or HARQ data is transmitted on the PUSCH regardless of whether any other data is transmitted on the PUSCH.

If persistent scheduling is not currently used for the UE 101, the channel selection processor 113 proceeds to select between the PUCCH and the PUSCH for a subframe dependent on whether other uplink data is transmitted on the PUSCH in this subframe. Specifically, if other data is transmitted using the PUSCH, the channel selection processor 113 selects the PUSCH and otherwise the PUCCH is selected.

Thus, in the system of FIG. 1, the UE 101 autonomously selects between the PUCCH and the PUSCH dependent on whether dynamic or persistent scheduling is currently used. Furthermore, the base station 103 autonomously determines what PUCCH resource to allocate to the UE 101 depending on whether dynamic or persistent scheduling is currently used. Specifically, as the operation of the UE 101 ensures that any uplink control data transmissions in subframes having a persistent allocation use the PUSCH, the PUCCH allocator 107 may not assign any PUCCH resources to the UE 101 for these subframes. Indeed, in some cases transmissions of uplink control data may be limited only to such subframes resulting in no need for any PUCCH resource allocation to the UE UE 101 whatsoever.

Figure 3:
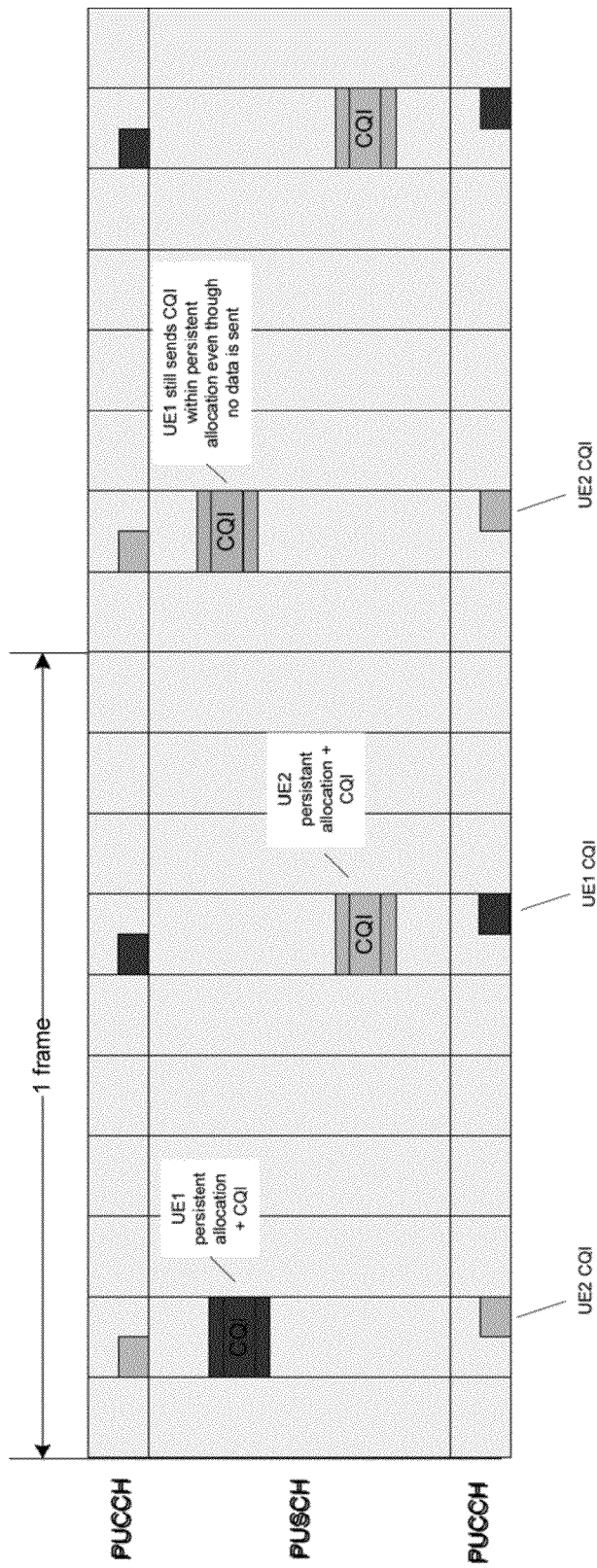
FIG. 3 illustrates an example of uplink user transmissions in a 3GPP communication system in accordance with some embodiments of the invention.

FIG. 3 illustrates an example of uplink transmissions on the PUCCH and PUSCH in accordance with such an approach.

It will be appreciated that the described approach provides a number of advantages. In particular, the approach can reduce the number of PUCCH subframes that need to be assigned for ARQ/CQI/PMI data. The approach reduces the loading on the PUCCH and may in some cases completely remove the need for any PUCCH resource to be allocated. Also, resource wastage due to unused PUSCH subframes is reduced and the operation of the base station is facilitated/simplified as the base station will always know where the uplink control data is transmitted when persistent scheduling is used. Furthermore, no dynamic PUCCH resource allocation is required thereby simplifying operation.

In some embodiments, the persistent resource allocations may be aligned such that the requirement for a PUCCH may be reduced or eliminated.

In some embodiments the shared channel scheduler 105 can align the PUSCH resource allocations of a persistent scheduling and the reporting times for the uplink control data.

As a specific example, the UE 101 may currently be required to provide CQI and PMI data at a given frequency. The base station 103 will have information of when the CQI/PMI data is to be transmitted from the UE 101 and accordingly the shared channel scheduler 105 can determine the subframes in which CQI/PMI data is sent. It can then continue to select these subframes for a persistent scheduling allocation thereby ensuring that resource of the PUSCH is allocated in the subframes wherein the CQI/PMI data is sent and thus that this data can be sent on the PUSCH rather than the PUCCH. It will be appreciated that in some scenarios, this may eliminate the requirement for any PUCCH allocation within the persistent scheduling interval (i.e. if a PUSCH allocation is provided to the UE 101 for each subframe in which CQI/PMI data is transmitted). In other scenarios, the CQI/PMI reporting rate may be higher than the frequency of PUSCH allocations (e.g. if the UE 101 only requests a low resource allocation). In such cases, the approach may reduce the loading of the PUCCH by increasing the number of times the PUSCH can be used instead of the PUCCH.

It will be appreciated that the shared channel scheduler 105 alternatively or additionally may change the timing of the uplink control data transmissions to comply with the PUSCH allocations of the persistent scheduling. For example, the shared channel scheduler 105 may set a reporting frequency for CQI/PMI data to be the same as a frequency of PUSCH subframes allocated to the UE 101.

In some embodiments, the shared channel scheduler 105 is arranged to align PUSCH resource allocations and PDSCH resource allocations for a persistent scheduling of both the PUSCH and PDSCH. The alignment is made such that transmission times of acknowledgement data corresponding to PDSCH resource allocations coincide with PUSCH resource allocations.

Specifically, when both downlink and uplink are persistently scheduled careful alignment of the uplink and downlink transmission times can ensure that the retransmission acknowledge data (ACK/NACK) for a downlink transmission in a persistently scheduled subframe of the PDSCH can be transmitted by an uplink transmission of a persistently scheduled subframe of the PUSCH. As a simple example, the shared channel scheduler 105 can allocate one subframe of each frame of the PUSCH and PDSCH to the UE 101 with the ACK/NACK message for a given PDSCH transmission being returned in the next allocated PUSCH subframe. Thus, the alignment/synchronisation of the persistent allocations for the PUSCH and PDSCH can ensure that retransmission acknowledge data can always be transmitted on the PUSCH thereby removing the necessity of a PUCCH allocation.

In some embodiments, the CQI data which is transmitted from the UE 101 to the base station 103 may be reduced if persistent scheduling is used for the PDSCH.

Typically, the CQI data is used by the shared channel scheduler 105 to perform very fast dynamic scheduling. However, when persistent scheduling is used, resource allocations relate to a plurality of frames and resource allocation updates are much slower. The shared channel scheduler 105 does therefore not require fast CQI updates as most of these will reflect the changes within a given duration of a persistent scheduling and therefore will not impact the resource allocation. In other words, if the downlink is persistently scheduled, link adaptation may only require slow CQI feedback.

Therefore, the frequency of the CQU transmissions may be reduced and specifically the shared channel scheduler 105 can instruct the UE 101 to only report CQI data on the PUSCH and the PUCCH allocator 107 may accordingly not assign any PUCCH resources to the UE 101.

If the PUSCH is also currently persistently scheduled, the UE 101 may transmit data in allocated subframes regardless of whether any other data is transmitted. If the PUSCH is not persistently scheduled, the CQI data may only be transmitted if other data is also transmitted in the given subframe. In this case, CQI feedback may only be allowed with other uplink data transmissions and thus no PUCCH needs to be assigned.

In some embodiments the number of bits used for each CQI indication is reduced if persistent scheduling is used for the PDSCH. Thus, the number of bits could be smaller than for a regular CQI report. For example, instead of a 5 bits CQI Value, a 2 bits relative value may be enough. As the persistent scheduling is much slower than dynamic scheduling, it is significantly less sensitive to the precision of the CQI feedback and therefore the reduced amount of bits does not lead to any significant degradation.

Persistent scheduling may frequently be used when a voice communication is carried over the PUSCH. For example, LTE envisages that VoIP communications will be supported by PUSCH communications and it is expected that persistent scheduling will be used for individual speech bursts. In such systems, the presence of uplink control data in an allocated subframe which does not comprise any voice data may be used as a silence indicator. The base station 103 can accordingly detect the end of a speech burst in response to receiving uplink control data in a PUSCH subframe not comprising any voice data. It will be appreciated that any suitable criterion for determining that a speech burst has terminated from receiving uplink control data only subframes can be used. For example, the base station 103 can determine that the speech burst has ended if more than a given number N of consecutive allocated PUSCH subframes has comprised uplink control data but no voice data.

In some embodiments, the shared channel scheduler 105 may also modify a persistent scheduling interval in response to the detection of the end of the speech burst. Specifically, when the end of the speech burst is detected the shared channel scheduler 105 may continue to perform persistent scheduling for the UE 101 but may increase the interval between resource allocation updates. For example, the persistent scheduling interval may be set to, say, 20 msecs during a speech burst and to, say, 160 msecs during a pause. Increasing the interval will allow the less frequent VoIP Silence Indications (SIDs) to be transmitted by the UE without wasting uplink resource.

It will be appreciated that the described processors, scheduler, allocator, detector, transmitter and receiver may be implemented in any suitable form. For example, the processors, means, scheduler, detector and allocator may be implemented as an executable routine implemented in a processing unit such as e.g. a micro-controller, a digital signal processor and/or a central processing unit. Specifically, the functionality of the processors and UE based means for may be implemented as a subroutine executed on the same processing unit of a UE. Similarly, the scheduler and allocator may be implemented as a subroutine executed on the same processing unit of a base station.

Also, it will be appreciated that any of the functional units may include suitable memory elements, such as solid state memory (ROM, RAM, Flash memory etc), magneto and/or optical storage devices (hard disk, optical disc etc).

Indeed it will be appreciated that all processors, means, scheduler, detector and allocator illustrated or described may be implemented as different unique sets of programming instructions that are executed on a processor (or distributed over a plurality of processors) of the UE or base station, or can each be electronic circuitry such as a custom large scale integrated circuit state machine (or part of one). As another example, the processors may be implemented partly or fully as neural networks and/or fuzzy computing.

Figure 4:
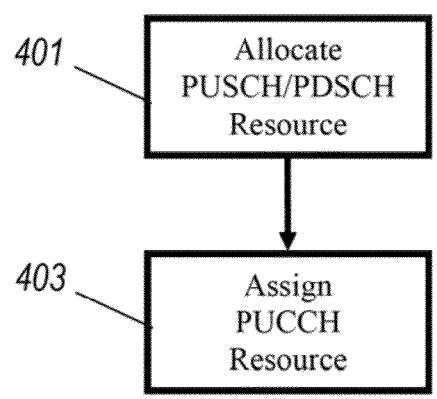
FIG. 4 illustrates an example of a method of operation for a 3GPP communication system in accordance with some embodiments of the invention.

FIG. 4 illustrates a method of operation for a 3$^{rd}$ Generation Partnership Project, 3GPP, communication system in accordance with some embodiments of the invention.

The method initiates in step 401 wherein a communication resource is allocated to a User Equipment. The communication resource is a communication resource of at least one of a Physical Uplink Shared CHannel, PUSCH, and a Physical Downlink Shared CHannel, PDSCH. The allocating of the communication resource is a dynamic scheduling wherein a resource allocation for a single frame is provided to the UE or a persistent scheduling wherein a resource allocation for a plurality of frames is provided to the UE.

Step 401 is followed by step 403 wherein resource of a Physical Uplink Control CHannel, PUCCH, is assigned to the User Equipment dependent on whether dynamic scheduling or persistent scheduling is performed for the User Equipment.

It will be appreciated that the above description for clarity has described embodiments of the invention with reference to different means for, functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A 3$^{rd}$ Generation Partnership Project, 3GPP, communication system comprising:
    a scheduler for allocating communication resource to a User Equipment, UE, the communication resource being a communication resource of at least one of a Physical Uplink Shared CHannel, PUSCH, and a Physical Downlink Shared CHannel, PDSCH, the scheduler being operable to perform a dynamic scheduling wherein a resource allocation for a single frame is provided to the UE or a persistent scheduling wherein a resource allocation for a plurality of frames is provided to the UE;
    a resource allocator for assigning resource of a Physical Uplink Control CHannel, PUCCH, to the UE, the assignment of the PUCCH resource to the UE being dependent on whether dynamic scheduling or persistent scheduling is performed by the scheduler for the UE.

2. The 3GPP communication system of claim 1 wherein the UE comprises a transmitter for transmitting uplink control data to a base station on a physical uplink channel; and
    a processor for selecting the physical uplink channel as the PUCCH or the PUSCH in response to whether persistent scheduling is used for the UE.

3. The 3GPP communication system of claim 2 wherein the UE is arranged to select the PUSCH in all subframes for which the UE has received a resource allocation by persistent scheduling.

4. The 3GPP communication system of claim 3 wherein the UE is arranged to select between the PUCCH and the PUSCH for a subframe when dynamic scheduling is used for the UE dependent on whether other uplink data is transmitted on the PUSCH in the subframe.

5. The 3GPP communication system of claim 2 wherein the scheduler is arranged to allocate the communication resource to a speech burst of a voice communication from the UE, and the communication system furthermore comprises:
    a detector for detecting the end of a speech burst in response to receiving uplink control data in a PUSCH subframe not comprising any voice data.

6. The 3GPP communication system of claim 5 wherein the scheduler is arranged to modify a persistent scheduling interval in response to the detection of the end of the speech burst.

7. The 3GPP communication system of claim 2 wherein the uplink control data comprises Channel Quality Indicator, CQI, data.

8. The 3GPP communication system of claim 2 wherein the uplink control data comprises retransmission acknowledgement data.

9. The 3GPP communication system of claim 2 wherein the uplink control data comprises, Precoding Matrix Index, PMI, data.

10. The 3GPP communication system of claim 1 wherein the scheduler is furthermore arranged to align PUSCH resource allocations of a persistent scheduling and reporting times of the uplink control data.

11. The 3GPP communication system of claim 1 wherein the scheduler is furthermore arranged to align PUSCH resource allocations and PDSCH resource allocations for persistent schedulings of both the PUSCH and PDSCH such that transmission times of acknowledgement data corresponding to PDSCH resource allocations coincide with PUSCH resource allocations.

12. The 3GPP communication system of claim 1 further comprising means for reducing an amount of Channel Quality Indicator, CQI, data transmitted from the UE if persistent scheduling is used for the PDSCH.

13. The 3GPP communication system of claim 12 wherein a number of bits used for each CQI indication is reduced if persistent scheduling is used for the PDSCH.

14. The 3GPP communication system of claim 12 wherein CQI data is transmitted only on the PUSCH.

15. The 3GPP communication system of claim 14 wherein CQI data is transmitted only when other uplink data is transmitted from the UE on the PUSCH.

16. The 3GPP communication system of claim 1 wherein the communication resource is a communication resource of the PUSCH.

17. The 3GPP communication system of claim 1 wherein the communication resource is a communication resource of the PDSCH.

18. A base station for a $3^{rd}$ Generation Partnership Project, 3GPP, communication system, the base station comprising:
- a scheduler for allocating communication resource to a User Equipment, UE, the communication resource being a communication resource of at least one of a Physical Uplink Shared CHannel, PUSCH, and a Physical Downlink Shared CHannel, PDSCH, the scheduler being operable to perform a dynamic scheduling wherein a resource allocation for a single frame is provided to the UE or a persistent scheduling wherein a resource allocation for a plurality of frames is provided to the UE;
- a resource allocator for assigning resource of a Physical Uplink Control CHannel, PUCCH, to the UE, the assignment of the PUCCH resource to the UE being dependent on whether dynamic scheduling or persistent scheduling is performed by the scheduler for the UE.

19. A User Equipment, UE, for a $3^{rd}$ Generation Partnership Project, 3GPP, communication system including a scheduler for allocating communication resource to the UE, the communication resource being a communication resource of at least one of a Physical Uplink Shared CHannel, PUSCH, and a Physical Downlink Shared CHannel, PDSCH, the scheduler being operable to perform a dynamic scheduling wherein a resource allocation for a single frame is provided to the UE or a persistent scheduling wherein a resource allocation for a plurality of frames is provided to the UE; the UE comprising:
- a transmitter for transmitting uplink control data to a base station on a physical uplink channel; and
- a processor for selecting the uplink communication channel as a Physical Uplink Control CHannel, PUCCH, or the PUSCH in response to whether persistent scheduling is used for the UE.

20. A method of operation for a $3^{rd}$ Generation Partnership Project, 3GPP, communication system comprising:
- allocating communication resource to a User Equipment, UE, the communication resource being a communication resource of at least one of a Physical Uplink Shared CHannel, PUSCH, and a Physical Downlink Shared CHannel, PDSCH, the allocating of the communication resource being a dynamic scheduling wherein a resource allocation for a single frame is provided to the UE or a persistent scheduling wherein a resource allocation for a plurality of frames is provided to the UE; and
- assigning resource of a Physical Uplink Control CHannel, PUCCH, to the UE dependent on whether dynamic scheduling or persistent scheduling is performed for the UE.

* * * * *